Sept. 8, 1959 A. TAICH ET AL 2,902,856
MEANS FOR LOCATING PUNCTURES IN TUBELESS TIRES
Filed April 23, 1956 2 Sheets-Sheet 2
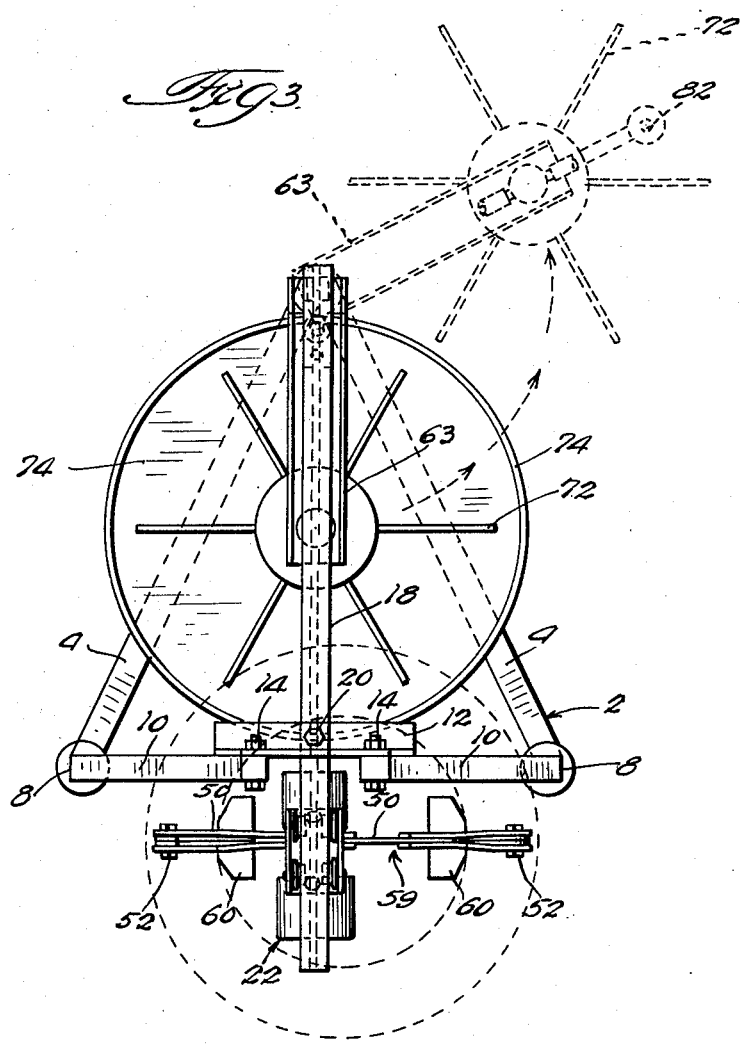
INVENTORS.
Albert Taich &
BY. Theodore Gill.
B. Gorda Aller.

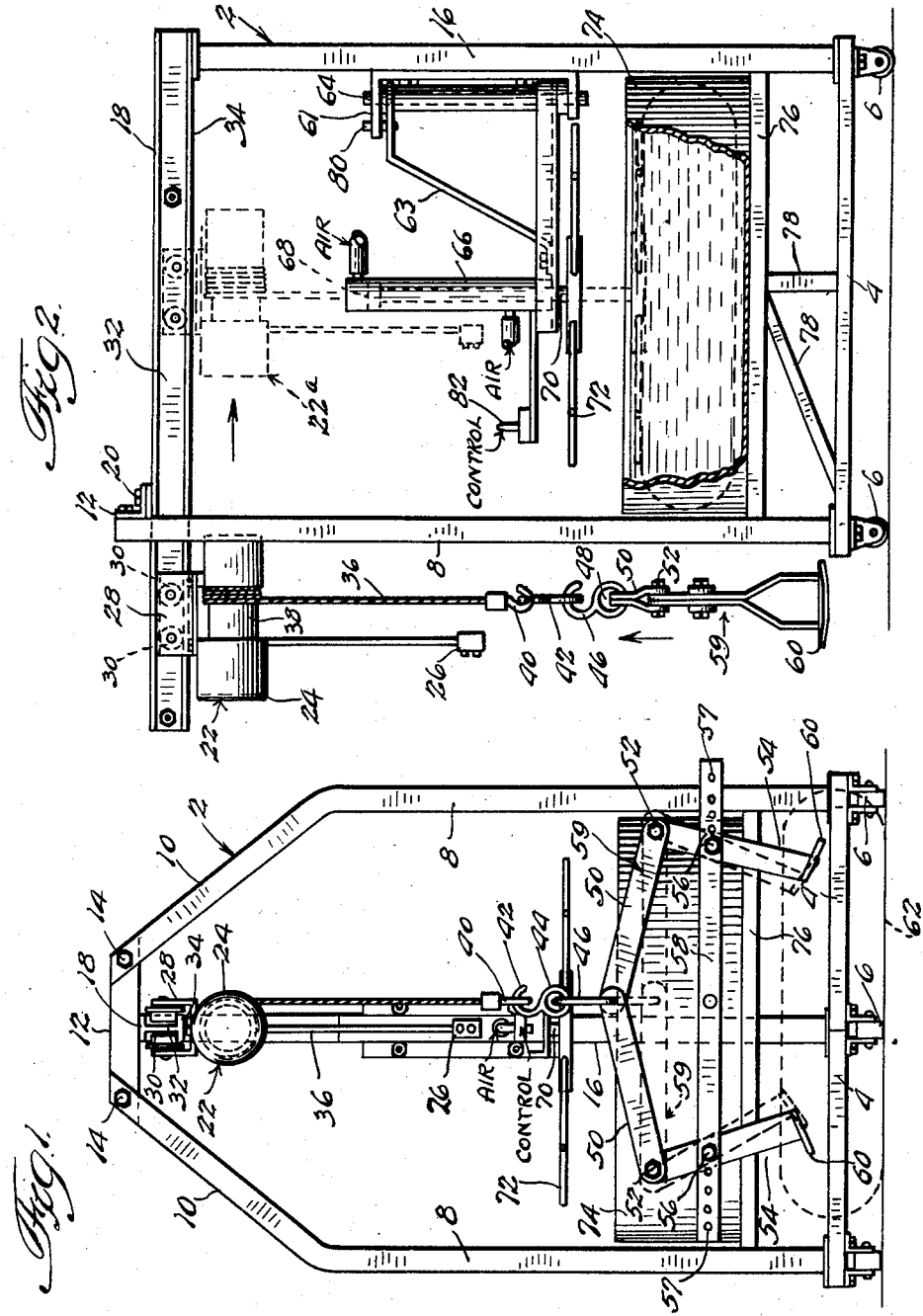

United States Patent Office 2,902,856
Patented Sept. 8, 1959

2,902,856

MEANS FOR LOCATING PUNCTURES IN TUBELESS TIRES

Albert Taich, Chicago, and Theodore Gill, North Lake, Ill., assignors to Consumers Tire & Supply Co., Inc., Chicago, Ill., a corporation of Illinois Application April 23, 1956, Serial No. 579,792

6 Claims. (Cl. 73—45.6)

This invention relates to a puncture locator for tubeless tires, and more particularly to a novel means for locating such punctures or leaks more rapidly and economically than by prior art practices.

The trend toward the use of tubeless tires which are air sealed by a rim or wheel mounting on vehicles such as trucks and large trailers has given rise to difficulties in detecting leaks in such tires not only because of their great size and weight but also because of the great force necessary to immerse them in a liquid such as water, as is necessary to locate such a leak by observing a stream of air bubbles emerging therefrom.

Prior art attempts to solve such difficulties have not been effective, and the most widely used prior art device consists of a tray or pan in which the tire is held with its rotational axis horizontally by a mechanical device similar to a jack. The tire is then rotated on its axis so that the thread of the tire is rotated through the water in the tray.

Such prior art practices have to some extent solved the difficulty in forcing or holding tubeless tires under water to locate leaks therein; however, prior to the present invention it has been necessary for at least two men to handle a large tire such as a truck tire, to place it in the tray. Furthermore, the prior art techniques have been expensive and time consuming, due not only to the delay and difficulty in placing the tire in the tray but also due to the necessity of rotating the tire in the tray.

According to the present invention, such prior art difficulties have been overcome and one man can quickly and efficiently locate leaks in tubeless tires regardless of their size or weight.

A primary object of the present invention is to eliminate the necessity for the manually handling or manipulation of a tubeless tire during any phase of leak locating in which the tire is immersed in water.

Another object of the invention is to eliminate the necessity for rotating the tire in the water.

A further object of the invention is to accommodate leak locating by one man in a highly efficient and rapid manner, as is required in large shops or where fleets of trailers or trucks are maintained.

Still another object of the invention is to completely submerge the tire in water, with the rotational axis of the tire vertical.

Yet another object of the invention is to devise a novel apparatus which occupies a relatively small area in a shop and which comprises means for lifting a tire into a water tank and other means for forcing the tire into the tank.

A more specific object of the invention is to devise an apparatus such as above described in which a skeletal frame is provided to permit the operator to view the submerged tire around the entire circumference thereof.

The foregoing and other objects of the invention will become apparent from a consideration of the following specification and the accompanying drawings, wherein:

Figure 1 is a front elevational view of a preferred form of apparatus embodying the invention;

Figure 2 is a side elevational view of the apparatus shown in Figure 1; and

Figure 3 is a top plan view of said apparatus.

Describing the invention in detail, it will be seen that the novel device comprises a skeletal frame 2 generally triangular as seen in top plan view and including a pair of horizontal straps 4 connected to each other and diverging from said connection as best seen in Figure 3, said straps having wheels 6 to afford portability. Spaced legs or columns 8 extend upwardly from the spaced or free ends of the straps 4, the upper ends of said legs converging upwardly as at 10 (Fig. 1) and being interconnected by a strap or tie 12, as by means of bolt and nut assemblies 14. A leg or column 16 extends upwardly from the interconnected ends of the straps 4, the upper end of said leg supporting an I beam 18 secured thereto in any convenient manner.

The I beam 18 is also secured to the bottom of the strap 12 as by a bolt and nut assembly 20 (Fig. 2 and 3) and extends outwardly beyond the legs 8 to afford a support externally of the space between the legs 8 and 16 for a hoist 22 which may be powered in any desired manner as for example by an electric motor 24 having a pendant control 26.

The hoist 22 is supported by a carrier 28 having a pair of wheels or rollers 30 at each side of a vertical web 32 of the I beam 18, said rollers having rolling engagement with the bottom horizontal web 34 of said beam. Thus the hoist 22 may be moved to a position shown by phantom lines at 22a in Figure 2 for a purpose hereinafter described.

The hoist 22 comprises a rope or cable 36 which may be wound upon a drum 38 (Fig. 2) or may be unwound therefrom upon desired actuation of the drum 38 by the motor 24.

At the lower end of the cable 36, a hook 40 is attached thereto for releasable engagement with a hook 42 having an eye 44 (Fig. 1) within which is received a hook 46 having an eye 48 (Fig. 2). The eye 48 is attached to corresponding ends of links 50, which have opposite corresponding ends pivoted at 52 to the upper ends of levers 54. The levers 54 are fulcrumed intermediate their ends by fulcrum pins or bolts 56 releasably received within longitudinally spaced fulcrum openings 57 of a fulcrum bar 58 to accommodate convenient adjustment of the distance between the levers 54, as may be desired in handling tires of various sizes.

The lower ends of the levers are provided with flanges defining feet 60, adapted to seat against the bottom of a tire 62 (Fig. 2) when a lifting force is exerted upon the eye 48 by the cable 36. It will be understood that such lifting force causes the left lever 54 shown in Figure 1 to rotate in a clockwise direction about its fulcrum 56 and causes the right lever 54 shown in that figure to rotate in a counterclockwise direction about its fulcrum 56, whereby the feet 60 are urged beneath the tire 62 supporting the latter at opposite sides of its normal rotational axis which is vertical as the tire is lifted.

Thus it may be noted that the links 50, the levers 54, and the fulcrum bar 58 constitute tongs generally designated 59 which are operated by the hoist 22 through the cable 36 to raise and lower a tire 62 for a purpose hereinafter described.

The column 16 is provided with a bracket 61 to which an arm or frame 63 is pivoted as by a pivot pin 64. The frame 63 carries a power device illustrated as an hydraulic or pneumatic cylinder 66 containing a piston 68 connected to a piston rod 70 which actuates a spider 72 to push a tire 62 below the level of water in a tank 74.

The tank is carried by a base or floor 76 supported by braces 78 extending between the floor 76 and the straps 4.

It may be noted that the frame 63 and spider 72 are moveable to and from a position directly above the tank and may be releaseably locked in said position by a latch pin 80 (Fig. 2); and the tongs 59 are moveable by means of the carrier 28 to a position directly above the tank, as shown by phantom lines in Figure 2, when the frame 63 and spider 72 are pivoted to one side as shown by phantom lines in Figure 3. The frame 63 is illustrated as pivotally mounted on the frame 2 and this affords a most efficient device within a minimum amount of space, however it may be noted that if space and expense are not material to a particular installation, the frame 63 may be mounted for linear movement to and from a position above the tank, in order to achieve certain objects of the invention. Furthermore, the spider 72 may be powered in any desired manner as by electricity, compressed air, hydraulic fluid, or even mechanical means such as a screw or lever.

Describing an operating cycle of the novel device and assuming that the tongs 59 are in the position shown by phantom lines in Figure 1, with the spider and its supporting frame in the position shown by phantom lines in Figure 3, the operator pushes a lift button on the pendant control 26 whereupon the motor 24 of hoist 21 is energized to revolve the drum 38 in the proper direction to wind the cable 36 thereon. As the cable 36 is wound on the drum, the cable exerts a lifting force on the eye 48 whereupon the feet 60 are urged to the position shown by solid lines in Figure 1 whereat said feet are beneath the tire 62 at oposite sides of its normal rotational axis to afford a firm two-point support for the tire.

Continued winding of the cable on the drum 38 causes the tongs 59 to lift the tire 62 above the upper level of the tank 74, whereupon the operator releases the lift button of the pendant control 26, to deenergize the motor 38 and hold the latter against further rotation in either direction.

The operator then pushes the tire 62 to a position above the tank 74 in alignment therewith, or if desired the carrier 28 may be powered for that purpose. With the tire 62 thus aligned with the tank 74, the operator pushes a down button of the pendant control 26 to energize motor 24 of hoist 22 so that said motor rotates the drum 38 in a direction to unwind the cable 36 from the drum 38 whereupon the tire is lowered into the tank 74 and floats upon the water or other liquid therein.

The operator then manually holds the feet 60 in the release position shown at phantom lines in Figure 1 and again pushes the lift button of the pendant control 26 until the tongs 59 have been lifted above the level of the tire 62 whereupon the carrier is pushed or power operated to the position shown at solid lines in Figure 2.

At this point in the cycle, the frame 63 is pivoted to the position shown at solid lines in Figure 3, and the power device 66 is energized as by a control button 82 (Fig. 2) to urge the spider 72 downwardly against the top of the tire 62 and thereby force the entire tire beneath the level of water in the tank 74.

The operator now locates any leak in the tire and marks the point at which said leak occurs, whereupon the device 66 is deenergized, the frame 63 is pivoted to the position shown by phantom lines in Figure 3, and the hoist 22 is returned to the position shown at 22a by phantom lines in Figure 2. The tongs 59 are then lowered to reengage the tire and lift the latter from the tank whereupon the hoist 22 is returned to the position shown at solid lines in Figure 1 to release the tire 62 and thereby complete an operating cycle of the novel device.

Thus it will be understood that the invention comprehends a novel apparatus for locating flaws in a tubeless tire which is compact and economical in design and is capable of enabling one man to quickly locate a leak in a tire which according to prior art practices required handling by at least two men.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. In a portable device for detecting a leak in a tubeless tire; the combination of a pair of straps having interconnected ends, said straps diverging from said ends and having their opposite ends spaced from each other, roller means on the bottom of said straps at said ends thereof, a pair of legs upstanding from said opposite ends, respectively, a tie interconnecting the upper ends of said legs, another leg upstanding from the interconnected ends of said straps, a beam carried by said other leg and by said tie, a member adapted for vertical adjustment moveably supported by said beam for movement lengthwise thereof, a water tank supported by said straps, a frame pivoted to said other leg for pivoted movement to and from a position above said tank, means operatively connected to said vertical adjustment member for releasably grasping a tire to be conveyed by said member to said tank, and means carried by said frame for urging a tire in said tank downwardly into water therein.

2. In a device for locating leaks in a tubeless tire, a frame comprising three columns, an I beam connected to said columns, said frame having a floor beneath a portion of said beam, said beam extending to a point externally of the space between said columns, a carrier moveably mounted on said beam for movement to a position above said floor and to another position externally of said space, a vertical adjustment member on said carrier, said member comprising a flexible line, tire engaging means on the lower end of said line, said tire engaging means comprising a pair of links pivotally connected to a pair of levers, said levers having flanges at their lower ends to define feet for grasping a tire, another frame pivoted to one of said columns, a power device on said frame, a spider operatively connected to said power device for actuation thereby, said other frame being pivotal to a position above said floor and to another position externally of said space, and a tank on said floor containing liquid into which a tire is forced by said spider.

3. In a device for locating leaks in a tubeless tire, the combination of a pair of tongs, a flexible line connected to said tongs for actuation and lifting thereof, a hoist for winding and unwinding said line, a water tank, said hoist being moveable to a position directly above said tank and to a position at one side thereof, a spider moveable to a position directly above said tank and to a position at one side thereof, and power means operatively connected to said spider to urge the latter downwardly into the tank to force a tire into water in said tank.

4. In a device for locating a leak in a tubeless tire; the combination of a skeletal frame which is in the form of a triangle as seen in top plan view, said frame having upstanding legs at the corners of the triangle, a beam connected to one leg and extending between the other two legs and to a position beyond the space between said legs, means carried by said other two legs to support the beam, a tank supported by the frame in said space and below said beam, tire raising and lowering means moveably mounted on the beam, power means pivoted to one of the legs for movement to a position above the tank, and means operatively connected to said power means for urging a tire downwardly into water in said tank.

5. In a portable device for detecting a leak in a tubeless tire, the combination of a skeletal frame having a floor, a water tank on said floor, a beam carried by said frame and extending above said floor, said beam extending externally of the frame, a member carried by said beam and adapted for vertical adjustment, said vertical adjustment member being provided at its lower end with adjustable tire lifting means comprising a pair of links pivotally connected to a pair of levers, each of said levers having a flange at its lower end to define a foot for grasping a tire, said levers being adapted when said adjustment member is adjusted vertically to rotate in clockwise and counterclockwise direction respectively to urge said member beneath said tire at opposite sides of its normal rotational axis when said tire is raised, means for conveying said raised tire to said water tank, and means carried by said frame for urging said tire downwardly into said tank.

6. A device, according to claim 5, wherein said levers are provided with spaced openings to permit adjustment of the distance therebetween.

References Cited in the file of this patent

UNITED STATES PATENTS

| | | |
|---|---|---|
| 1,294,320 | Storm | Feb. 11, 1919 |
| 1,854,556 | Moebes et al. | Apr. 19, 1932 |
| 2,422,848 | Peters | June 24, 1947 |
| 2,508,246 | Gerstenslager | May 16, 1950 |
| 2,679,092 | Austin | May 25, 1954 |
| 2,699,874 | Bernaerts | Jan. 18, 1955 |